United States Patent
Bening et al.

(10) Patent No.: US 11,292,958 B2
(45) Date of Patent: Apr. 5, 2022

(54) OIL-BASED SLURRIES AND METHODS FOR MAKING

(71) Applicant: Kraton Polymers LLC, Houston, TX (US)

(72) Inventors: Robert C Bening, Houston, TX (US); Steven Huynh, Houston, TX (US); David Sam Germack, Houston, TX (US)

(73) Assignee: KRATON POLYMERS LLC, Houston, TX (US)

( * ) Notice: Subject to any disclaimer, the term of this patent is extended or adjusted under 35 U.S.C. 154(b) by 0 days.

(21) Appl. No.: 17/248,051

(22) Filed: Jan. 7, 2021

(65) Prior Publication Data

US 2021/0214603 A1     Jul. 15, 2021

Related U.S. Application Data

(60) Provisional application No. 62/959,270, filed on Jan. 10, 2020.

(51) Int. Cl.
| | |
|---|---|
| *C09K 8/64* | (2006.01) |
| *C09K 8/60* | (2006.01) |
| *C09K 8/588* | (2006.01) |
| *C09K 8/524* | (2006.01) |
| *C09K 8/54* | (2006.01) |
| *C09K 8/584* | (2006.01) |

(52) U.S. Cl.
CPC .............. *C09K 8/64* (2013.01); *C09K 8/524* (2013.01); *C09K 8/54* (2013.01); *C09K 8/584* (2013.01); *C09K 8/588* (2013.01); *C09K 8/602* (2013.01); *C09K 8/605* (2013.01); *C09K 2208/08* (2013.01); *C09K 2208/22* (2013.01); *C09K 2208/32* (2013.01)

(58) Field of Classification Search
None
See application file for complete search history.

(56) References Cited

U.S. PATENT DOCUMENTS

| | | | | |
|---|---|---|---|---|
| 5,091,448 A * | 2/1992 | Hostettler | ............... | C04B 28/02 524/45 |
| 5,488,083 A * | 1/1996 | Kinsey, III | .......... | C08B 37/0096 507/211 |
| 5,565,513 A * | 10/1996 | Kinsey, III | ............. | C09K 8/685 524/405 |
| 6,667,354 B1 * | 12/2003 | Fox | ........................... | C08J 3/09 524/306 |
| 2002/0019318 A1 * | 2/2002 | Harris | ........................ | C08L 5/14 507/200 |
| 2021/0301193 A1 * | 9/2021 | Bening | ..................... | C09K 8/64 |

* cited by examiner

Primary Examiner — John J Figueroa

(57) ABSTRACT

An oil-based slurry composition comprising hydratable (water-soluble) materials with improved settling properties is disclosed with the addition of a suspending agent to the slurry mixture. The suspending agent is a styrenic diblock copolymer of formula A-B. The styrenic diblock copolymer is a hydrogenated styrene-(ethylene/propylene) (S-EP) block copolymer having a molecular weight of 175-225 kg/mole and a polystyrene (PSC) content of 30-50%. The block copolymer maintains the water-soluble materials in suspension in the mixture with less than 3 wt. % free hydrocarbon solvent separation after at least 1 day standing.

20 Claims, No Drawings ic polymer. Suitable hydrocarbon solvents include mineral oils, kerosene, jet-fuel, white oils, diesel oils, olefins, organic esters, synthetic fluids, and mixtures thereof.

OIL-BASED SLURRIES AND METHODS FOR MAKING

CROSS-REFERENCE TO RELATED APPLICATIONS

This application claims priority from U.S. Provisional Application No. 62/959,270, with a filing date of Jan. 10, 2020, which disclosure is incorporated herein by reference.

TECHNICAL FIELD

The disclosure relates to slurry compositions for use in underground formations, and suspension agents for use in such compositions.

BACKGROUND

Enhanced oil recovery or EOR is the process of increasing the amount of petroleum that can be recovered from underground or subterranean formations, typically by injecting a substance into an existing oil well/the formation to increase the pressure to force petroleum out of the ground. Chemical EOR is a method wherein a dilute solution containing chemicals is injected into the formation to aid mobility and reduction in surface tension of the oil, facilitating recovery. Hydraulic fracturing or fracking is a well stimulation technique in which rock is fractured by a pressurized composition containing water, proppants such as sand, and chemicals under high pressure into the formation.

Compositions for use in chemical EOR or fracturing applications can be prepared from a slurry composition containing a water-swellable component such as a cross-linked polymer. It is often a challenge to blend the water-swellable component into the base fluid at operating temperatures of the blending units to form the slurry, while still providing suspension at higher temperatures, allowing the slurry to be free flowing, pumpable, and dispersible into a carrier fluid on site.

Settling of solids in slurry compositions during storage has been a problem requiring re-blending prior to use, particularly at a temperature above ambient. There is a need for improved additives for use in oil-based slurry compositions, allowing the slurry to maintain suspension at a wide range of temperatures.

SUMMARY

In one aspect, the disclosure relates to a slurry composition comprising a hydratable material with improved settling properties. The composition comprises a mixture of: 40 to 60 wt. % of a hydrocarbon solvent selected from mineral oils, kerosene, jet-fuel, white oils, diesel oils, olefins, organic esters, synthetic fluids, and mixtures thereof; 40 to 60 wt. % of water-soluble polymer selected from water-based polysaccharides, polyethylene oxide, acrylamide polymers, and mixtures thereof; and 1 to 3 wt. % of a styrenic diblock copolymer of formula A-B as a suspending agent, wherein the styrenic diblock copolymer is a hydrogenated styrene-(ethylene/propylene) (S-EP) block copolymer having a molecular weight of 175-225 kg/mole and a polystyrene (PSC) content of 30-50%; an wherein the suspending agent maintains the water-soluble polymer in suspension in the mixture with less than 3 wt. % free hydrocarbon solvent separation after at least 3 day standing. In embodiments, the slurry composition has a minimum mixing temperature of <=95° F.

DESCRIPTION

The following terms used the specification have the following meanings:

"Subterranean formation" or "underground formation" encompasses both areas below exposed earth and areas below earth covered by water, e.g., sea or ocean.

"Vinyl" refers to the presence of a pendant vinyl group on the polymer chain.

"Vinyl content" is used to describe a polymer that is made when the conjugated diene 1,3 butadiene is polymerized via 1,2-addition (and isoprene via a 3,4-addition), resulting in a pendant olefin, or vinyl group, adjacent to the polymer backbone. Vinyl content can be measured by nuclear magnetic resonance spectrometry (NMR).

"Polystyrene content" or PSC of a block copolymer refers to the % weight of vinyl aromatic, e.g., polystyrene in the block copolymer, calculated by dividing the sum of molecular weight of all vinyl aromatic blocks by the total molecular weight of the block copolymer. PSC can be determined using any suitable methodology such as proton nuclear magnetic resonance (NMR).

"Molecular weight" or MW refers to the styrene equivalent molecular weight in kg/mol of a polymer block or a block copolymer. MW can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. MW of polymers measured using GPC so calibrated are styrene equivalent molecular weights or apparent molecular weights. MW expressed herein is measured at the peak of the GPC trace-and are commonly referred to as "styrene equivalent peak molecular weight," designated as $M_p$.

"Free-flowing" means a composition requiring a force of less than 400 lbs/ft$^2$ to break in a blocking test. In some embodiments, the force required is less than 300 lbs/ft$^2$.

"Blocking test" refers to a test in which the block cylinder is filled with crumbs with a length of approximately ⅔ to full. Weights of approximately 5.0 lbs are placed onto each crumb inside the block cylinder. The assembly is placed in an oven at a temperature of 110° F. (43° C.). After 7 days, the cylinder is removed from the oven and weight is removed. Both top and bottom of the cylinder are removed, and the cylinder is opened at the side. The sample (of crumbs) is placed onto a test holder as a block for observation and further testing. Weight can be slowly added on top of the sample block until the sample block collapses into crumb. Some samples may crumble immediately into free-flowing crumbs as they are removed from the cylinder and placed onto the test holder, some may crumble on the outside but can still be fused together in a core center requiring some force to break the fused core, and some stay as a block that would need force or weight to break the sample block into free-flowing crumbs.

The disclosure relates to an oil-based slurry composition for use in underground formations comprising a water-soluble polymer suspended in liquid carrier with the aid of a styrenic block copolymer as a suspension agent (or anti-settling agent). In embodiments, the composition further comprises additives such as surfactants.

Liquid Carrier—Hydrocarbon Component: The liquid carrier can be any hydrocarbon solvent that has appropriate physical properties (viscosity, flashpoint) and toxicological characteristics, and does not dissolve or swell the water-soluble polymer. The solvent helps insulate the water-soluble polymer from moisture exposure from the environment, prevent premature hydration of the polymer.

In embodiments, the solvent is selected from mineral oil, kerosene, jet-fuel, white oils, diesel oils, olefins (POA or polyalpha olefins), organic esters, synthetic fluids, and mixtures thereof. In embodiments, the solvent is an ester-based oil or mixtures thereof, e.g., particularly bio-derived oil such as vegetable derived oil, liquid at ambient temperature. In embodiments, the ester based oil refers to an ester of a C12 to C20 fatty acid (mono-carboxylic acid) with a C1 to C10 hydroxyl compound.

In embodiments, the liquid carrier is a "raffinate," derived from a kerosene or other middle distillate hydrocarbon stream by hydrotreating the kerosene to remove polynuclear aromatics, sulfur and nitrogen and then removing the linear paraffins from the hydrotreated kerosene stream by a suitable process. Examples of commercially available raffinates are marketed under the name "ODC" by Sasol. In embodiments, the solvent comprises a mixture of linear, mono- di- and tri-alkyl benzenes. In embodiments, the liquid carrier is a hydrotreated raffinate, comprising naphthenes, branched paraffins and cycloparaffins, e.g., products marketed under the name LPA by SASOL.

The amount of liquid carrier in the slurry ranges from 40-70 wt. %, or 45-65%, or less than 60%, or at least 45% the total weight of the slurry.

Water Soluble Polymer Component: The water-soluble polymer component can be synthetic or natural, referring to substances that dissolve, disperse or swell in water and, thus, modify the physical properties of aqueous systems in the form of gellation, thickening or emulsification/stabilization. In embodiments, the water soluble component is a natural material, a water-based polysaccharide such as cellulose or starch and derivatives, Xanthan or Xanthan derivatives, or guar and derivatives thereof. In embodiments, the water-based polysaccharide has a molecular weight from 200,000 to 3,000,000. Examples include guar derivatives such as carboxyalkyl guars and hydroxyalkyl guars. In embodiments, the guar derivatives are selected from hydroxypropyl guar, carboxymethyl guar, carboxymethyl hydroxypropyl guar and cationic guar. In embodiments, the guar is in a powder form. Typically, powders having a size of between about 60 mesh and about 400 mesh, more typically between about 100 to mesh. The guar may have a particle size below 500 pm (micron), preferably below 300 pm and most preferably below 200 pm.

In embodiments, the water soluble polymer is a synthetic polymer such as polyethylene oxide, polyacrylamide or acrylamide polymer, e.g., acrylamide homopolymers and copolymers of acrylamide with other monomers such as acrylamide-acrylate copolymer.

The amount of water-soluble polymer in the slurry ranges from 40-70 wt. %, or 45-65%, or less than 60%, or at least 45% of the total weight of the slurry.

Suspension Agent Component: The suspension agent comprises a styrenic diblock copolymer of formula A-B, wherein the A segment where A is a monoalkenyl arene block, B is a conjugated diene block. In embodiments, the diblock copolymer is a hydrogenated styrene-(ethylene/propylene) (SEP) block copolymer.

The diblock copolymer can be made by a sequential polymerization process in which the first step comprises polymerizing isoprene with an organolithium initiator until polymerization of the isoprene is substantially complete. In a second step, a mono vinyl aromatic monomer is added to copolymerize from the polyisoprene block produced in the first step. Polymerization occurs spontaneously, and is allowed to proceed until substantially all the comonomers have polymerized to form a polypolyisoprene-polystyrene copolymer diblock.

The diblock copolymer has a molecular weight of 150-250 kg/mol, or at least 160 kg/mol, or 175-225 kg/mole, or at most 210 kg/mol; a polystyrene (PSC) content of 30-50%, or at least 32%, or at least 34%, or less than 42%, or less than 40%, or 35-37%.

In embodiments, the suspending agent diblock copolymer is coated with a dusting agent in an amount from 0.02 to 2 wt. % (based on the total weight of the block copolymer), or at least 0.1 wt. %, and or 0.2 to 0.8 wt. %. The dusting agents in embodiments are selected from fumed silica, talcs, calcium carbonate, and the like. In embodiments, the dusting agent is a hydrophilic fumed silica having a surface area (BET, measured by nitrogen gas adsorption) in the range of 175-500 $m^2/g$. In embodiments, the dusting agent is a hydrophilic fumed silica with a tamped density of <75 g/L, a surface area (BET, measured by nitrogen gas adsorption) of at least 200 $m^2/g$, and a pH of 3 to 5.

The amount of diblock copolymer for use as suspending agent ranges from 0.50% to 3 wt. %, or at least 0.75 wt. %, or at least 1 wt. %, or less than 2.5 wt. %, or less than 2 wt. %, or 1.2-1.8 wt. %, based on the total weight of the slurry composition.

Other Optional Components: In embodiments, the slurry composition further comprises any of other conventional additives, e.g., corrosion inhibitors, surfactants, demulsifying agents, pH modifiers, scale inhibitors, asphaltene inhibitors, paraffin inhibitors, gas hydrate inhibitors, dispersants, fibers, conditioning agents, oxygen scavengers, biocides and the like, in an amount ranging from 0.1 to 3 wt. %, or 0.25 to 2.5 wt. %, less than 2 wt. %, or at least 0.5 wt. %.

Suitable surfactants are selected from surface active agents which can function as any of emulsifiers, dispersants, foamers or defoamers. In some embodiments, the surfactant is an anionic surfactant, e.g., alkyl carboxylates, alkyl ether carboxylates, alkyl sulfates, alkyl ether sulfates, alkyl sulfonates, alpha olefin sulfonates, alkyl phosphates and alkyl ether phosphates. In embodiments, cationic surfactants are employed, e.g., alkyl amines, alkyl diamines, alkyl ether amines, alkyl quaternary ammonium, dialkyl quaternary ammonium and ester quarternary ammonium compounds. Ionic surfactants can also be used, e.g., zwitterionic surfactants and amphoteric surfactants such as alkyl betaines, alkyl amido betaines, alkyl imidazolines, alkyl amine oxides and alkyl quarternary ammonium carboxylates.

If present, the amount of surfactants ranges from 0.75-2 wt. %, or at least 1 wt. % based on the total weight of the slurry composition.

Preparation: The slurry composition is prepared from water-swellable polymer in a powder form. The preparation of the slurry concentrates requires high shearing energies to disperse the polymer in hydrocarbon solvents before use in the hydration process. In embodiments, an effective amount of the suspension agent diblock copolymer is pre-mixed in the hydrocarbon solvent. Thereafter, the water-soluble polymer is added, forming a slurry. In the next step, the slurry is then added to an aqueous stream (e.g., brine) at the product site (inverting the water-soluble polymer in water), allowing the water-swellable polymer to hydrate or is released into water.

In embodiments, the suspending agent is added to the hydrocarbon solvents at the same time of the addition of the water-swellable polymer.

Properties & Applications: With the addition of the diblock copolymer suspension agent, the slurry is characterized as having adequate stability during the manufacturing process and after (in storage), and can be readily dispersed or diluted into water to facilitate the rapid release of the water-swellable polymer. In embodiments, the addition of the diblock copolymer even in concentration as low as 2 wt. % (based on the total weight of the hydrocarbon solvent) imparts a thixotropic behavior to the viscosified base fluid, improving the solids suspending properties of the slurry, allowing the slurry composition to be heated up to above 100° F., or above 120° F., or up to 150° F., with stable suspension (minimal sign of settling) after many hours of standing, for use in production fields/hydraulic fracturing applications for improved efficiency.

The slurry viscosity varies according to the type of hydrocarbon solvent employed and/or the amount and type of water-swellable polymer used. In embodiments, the slurry has a viscosity in the range of 500-2200 cp (measured at 70° F. and 100 rpm), or at most 2000 cp, or at most 1700 cp. In embodiments, a slurry containing <=3% of the SBC has a viscosity at 70° F. of <1500 cp, or <1400 cp, or <1300 cp.

In embodiments, a slurry containing <=3% of the SBC can be mixed at a minimum temperature of <=95° F. for the slurry to maintain suspension for a period of at least 3 days; or ambient to <=95° F., or >=50° F., or >=60° F., or >=70° F., or 75-95° F. Minimum mixing temperature refers to the lowest mixing temperature needed that still provides adequate stability, e.g., still maintaining particle suspension. The minimum temperature to maintain suspension in embodiments depend on factors including the type of hydrocarbon solvent, the water-swellable polymer, and/or the surfactant used if any, and to a certain extent the mixing equipment.

In embodiments, a slurry containing <=3% of the SBC has a maximum suspension temperature of at least 120° F., or at least 130° F., or at least 150° F. The maximum temperature is the highest temperature at which suspension is observed.

The slurry with ability to maintain suspension at a wide range of temperatures is not limited for use in EOR/hydraulic fracturing operations. It can also be used for preparing completion fluids, production fluids and other fluids for use in oil and gas operations such as drilling, stimulations, etc., where hydratable polymers are used. It can also be used in waste water treatment, as a flocculant or as a dehydrating agent, in paper manufacturing as a paper chemical or sizing agent, or in textile printing as thickeners.

Examples: The following illustrative example is intended to be non-limiting.

In the examples, the samples are evaluated for a number of factors: a) easy of mixing, defined by the minimum mixing temperature needed to provide particle suspension in a given base fluid; b) maximum temperature at which particle suspension; c) efficiency, or the minimum polymer concentration needed to provide suspension; and d) suspension viscosity.

Viscosified base fluid samples at 2.5 and 3.0% wt. concentration were prepared by mixing the styrenic block copolymer (SBC) suspending agents and a base oil at 500 rpm at ambient temperature (75-80° F.). If the solution remained milky or extremely hazy, the temperature was increased by 10° F. This process was continued until a water white or slightly hazy, bluish solution was obtained or the temperature reached 110° F., then surfactant in an amount sufficient for a final concentration in the slurry of 1 wt. % was added to the samples and remixed for 10 minutes. These samples are referred to as viscosified base fluids in the examples.

For each of the examples, 4 pound per gallon (ppg) guar slurries were prepared from the viscosified base fluids by mixing at an increasing speed up to 2100 rpm while adding the guar. Once all the guar had been added, the speed was kept at 2100 rpm until temperature reached the mixing temperature used to prepare the corresponding viscosified base fluid, then lowered to 1800 rpm. Temperature was maintained at about 100° F. for 60 minutes of mixing.

Shear stress as a function of shear rate curves were collected on the viscosified base fluids and suspensions using an Anton Paar MCR rheometer (concentric cylinder geometry) from 0.01-500 $s^{-1}$, in a stepped temperature starting at 70° F. and increasing the temperature in 10° F. increments until the final temperature of 150° F. is reached. The fluids were cooled to 120° F. and then 70° F. Shear stress at 0.01 $s^{-1}$ is used as the effective yield stress.

The highest temperature at which an effective yield stress of at least about 1 Pa was observed and recorded.

A viscometer was used to measure the slurry viscosity at 70° F. at 2, 3, 6, 100, 300 and 600 rpm. A settling test, which measures how much free oil appears in a 100 mL graduated cylinder containing the slurry after standing for a prescribed time interval, was performed on all samples at ambient temperature, 120 and 150° F. in a Baxter DP-41 vacuum drying oven, with the vacuum off.

Each slurry sample was checked for free oil after 1, 2, 3 and, in some cases, 7 and 30 days. Less than or equal to 3 mL (3%) free oil is considered acceptable settling.

The following components were used in the examples:

Suspending Agent SBC 1 is a diblock copolymer having a PSC of 48, a styrene equivalent peak molecular weight Mp of 233 kg/mol, and a breaking force of 166 lbs·$in^2$ in a blocking test.

Suspending Agent SBC 2 is a diblock copolymer having a PSC of 44, Mp of 201 kg/mol.

Suspending Agent SBC 3 is a diblock copolymer having a PSC of 32, Mp of 205 kg/mol, and a breaking force of 221 lbs·$in^2$.

Suspending Agent SBC 4 is a diblock copolymer having a PSC of 36, Mp of 197 kg/mol, and a breaking force of 276 lbs·$in^2$.

Suspending Agent SBC 5 is a diblock copolymer having a PSC of 40, Mp of 180 kg/mol, and a breaking force of 442 lbs·$in^2$.

Suspending Agent SBC 6 is a diblock copolymer having a PSC of 28, Mp of 181 kg/mol, and a breaking force of 828 lbs·$in^2$.

Solvent 1 is a low aromatics/polycyclic aromatic petroleum distillate base oil with a flash point of 81° C., a pour point of −39° C., and a viscosity at 40° C. of 1.6 cSt.

Solvent 2 is a mixture of hydrotreated isoparaffins and naphthenics with very low levels of polynuclear aromatics, with a flash point of >60° C., a pour point of <−68° C., and a viscosity at 40° C. of 1.6 cSt.

Solvent 3 is a mixture of synthetic blend of paraffin, olefin, and oxygenates with very low levels of polynuclear aromatics, with a flash point of >81° C., a pour point of <−25° C., and a viscosity at 40° C. of 2.2 cSt.

A biodegradable nonionic surfactant (ethoxylate) was used in all examples.

Examples 1-5: Table 1 summarizes the results for slurry compositions made with 3 wt. % suspension agent in Solvent 2 as the solvent in the viscosified base fluids. The viscosity of the slurry composition was measured at 70° F.

at 100 rpm (using OFITE 900 viscometer—F2 spring R1B1 bob). Minimum temperature is the lowest mixing temperature to produce at fluid with a shear stress value of at least 1 Pa at 0.01 s-1 of at least 70° F. Maximum temperature is the highest temperature at which a stable suspension is observed. The suspension prepared from SBC 1 exhibited adequate stability and viscosity, but required a high mixing temperature. The suspension prepared from SBC 5 failed to provide adequate high temperature stability. The suspensions prepared from SBC 2, 3 and 4 provided a superior balance of mixing temperature, viscosity and high-temperature stability.

TABLE 1

| Ex. | Suspending Agent | Min. $T_{mix}$ ° F. | Suspension $T_{max}$ ° F. | Viscosity cp |
|---|---|---|---|---|
| 1 | SBC 1 | 110 | 150 | 751 |
| 2 | SBC 2 | 90 | 150 | 833 |
| 3 | SBC 3 | 90 | 120 | 1120 |
| 4 | SBC 4 | 90 | 120 | 1295 |
| 5 | SBC 5 | 80 | 70 | 1503 |

Examples 6-9: Table 2 summarizes the results for slurry compositions made with 3 wt. % suspension agent in Solvent 1 as the solvent in the viscosified base fluids. Suspensions prepared from SBC 3, 4 and 5 exhibited a good balance of low mixing temperature, stability at elevated temperatures and viscosity. The suspension prepared from SBC 6 exhibited poorer stability at elevated temperatures as well as a higher viscosity.

TABLE 2

| Ex. | Suspending Agent | Min. $T_{mix}$, ° F. | Suspension $T_{max}$ ° F. | Viscosity cp |
|---|---|---|---|---|
| 6 | SBC 3 | 90 | 150 | 1084 |
| 7 | SBC 4 | 90 | 150 | 1340 |
| 8 | SBC 5 | 80 | 130 | 1490 |
| 9 | SBC 6 | 75 | 120 | 1790 |

Examples 10-11: Slurry compositions were prepared with 3 wt. % suspending agent in Solvent 3 and observed for settling over a period of time. Results are shown in Table 3, with Example 10 being made with SBC 1, and Example 11 being made with SBC 4 as the suspending agents respectively. The suspension prepared from SBC 1 exhibited some settling when tested at lower temperatures. This observation suggests that the polymer had not been fully "activated", that experienced enough heat and shear to exhibit its optimal rheological performance, even after mixing at 110° F. In contrast, the suspension prepared by mixing SBC 4 (Example 11) at 100° F. exhibited no settling at any of the test temperatures.

TABLE 3

| | Example 10 | Example 11 |
|---|---|---|
| $T_{mix}$ (° F.) | 110° F. | 100° F. |
| 70° F. Settling 24 hrs | <0.5% | 0% |
| 70° F. Settling 48 hrs | <0.5% | 0% |
| 70° F. Settling 72 hrs | 1% | 0% |
| 120° F. Settling 24 hrs | <0.5% | 0% |
| 120° F. Settling 48 hrs | <0.5% | 0% |
| 120° F. Settling 72 hrs | 1% | 0% |
| 150° F. Settling 24 hrs | 0% | 0% |
| 150° F. Settling 48 hrs | 0% | 0% |
| 150° F. Settling 72 hrs | 0% | 0% |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A slurry composition comprising a mixture of:
   40 to 60 wt. % of a hydrocarbon solvent selected from mineral oils, kerosene, jet-fuel, white oils, diesel oils, olefins, organic esters, synthetic fluids, and mixtures thereof;
   40 to 60 wt. % of water-soluble polymer selected from water-based polysaccharides, polyethylene oxide, acrylamide polymers, and mixtures thereof; and
   1 to 3 wt. % of a styrenic diblock copolymer as a suspending agent, wherein the styrenic diblock copolymer is a hydrogenated styrene-(ethylene/propylene) (S-EP) block copolymer, having a styrene equivalent peak molecular weight $M_p$ of 175-225 kg/mole and a polystyrene (PSC) content of 30-50%;
   wherein the suspending agent maintains the water-soluble polymer in suspension in the slurry composition with less than 3 wt. % free hydrocarbon solvent separation after at least 1 day standing at 110° F., the wt. % is based on the total weight of the slurry composition; and
   wherein the slurry composition has a minimum mixing temperature of less than or equal to 95° F.

2. The slurry composition of claim 1, wherein the slurry composition has a viscosity at 70° F. of <1500 cp.

3. The slurry composition of claim 1, wherein the slurry composition has a maximum suspension temperature of at least 120° F.

4. The slurry composition of claim 1, wherein the slurry composition has a maximum suspension temperature of at least 150° F.

5. The slurry composition of claim 1, wherein the suspending agent maintains the water-soluble polymer in suspension in the mixture with less than 3 wt. % free hydrocarbon solvent separation after at least 3 day standing.

6. The slurry composition of claim 1, wherein the hydrogenated styrene-(ethylene/propylene) (S-EP) block copolymer has a PSC content of at least 32%.

7. The slurry composition of claim 1, wherein the hydrogenated styrene-(ethylene/propylene) (S-EP) block copolymer has a PSC content of at most 40%.

8. The slurry composition of claim 1, wherein the hydrogenated styrene-(ethylene/propylene) (S-EP) block copolymer has a PSC content of 35-37%.

9. The slurry composition of claim 1, wherein the suspending agent is present in an amount of equal or less than 2.5 wt. %.

10. The slurry composition of claim 9, wherein the suspending agent is present in an amount of less than 2 wt. %.

11. The slurry composition of claim 10, wherein the suspending agent is present in an amount of 1.2-1.8 wt. %.

12. The slurry composition of claim 1, wherein the suspending agent is coated with a hydrophilic fumed silica with a tamped density of less than 75 g/L, a surface area (BET, measured by nitrogen gas adsorption) of at least 200 $m^2/g$, and a pH of 3 to 5.

13. The slurry composition of claim 1, further comprising from 0.1 to 3 wt. % of an additive selected from corrosion inhibitors, surfactants, demulsifying agents, pH modifiers, scale inhibitors, asphaltene inhibitors, paraffin inhibitors, gas hydrate inhibitors, dispersants, fibers, conditioning agents, oxygen scavengers, biocides and mixtures thereof.

14. The slurry composition of claim 1, further comprising from 0.1 to 2 wt. % of a surfactant selected from anionic surfactants, ionic surfactants, and mixtures thereof.

15. A hydraulic fracturing composition comprising the slurry composition of claim 1.

16. An enhanced oil recovery (EOR) fluid comprising the slurry composition of claim 1.

17. A method for making a slurry for use for subsequent inversion into a hydraulic fracturing or enhanced oil recovery (EOR) fluid, comprising:
   dissolving 1 to 3 wt. % of a styrenic diblock copolymer as a suspending agent into 40 to 60 wt. % a hydrocarbon solvent forming a mixture, wherein
   the hydrogen solvent is selected from mineral oils, kerosene, jet-fuel, white oils, diesel oils, olefins, organic esters, synthetic fluids, and mixtures thereof,
   the styrenic diblock copolymer is a hydrogenated styrene-(ethylene/propylene) (S-EP) block copolymer having a molecular weight of 175-225 kg/mole and a polystyrene (PSC) content of 30-50%; and
   adding to the mixture of hydrocarbon solvent and suspending agent 40 to 60 wt. % of a water-soluble polymer selected from water-based polysaccharides, polyethylene oxide, acrylamide polymers, and mixtures thereof, forming the slurry;
   wherein the suspending agent maintains the water-soluble polymer in suspension in the slurry with less than 3 wt. % free hydrocarbon solvent separation after at least 1 day standing, the wt. % is based on the total weight of the slurry; and
   wherein the slurry has a minimum mixing temperature of less than or equal to 95° F.

18. The method of claim 17, wherein the slurry has a viscosity at 70° F. of <1500 cp and a maximum suspension temperature of at least 120° F.

19. A method for rapidly dissolving a water-soluble polymer into solution, comprising:
   providing a slurry 40 to 60 wt. % of a hydrocarbon solvent selected from mineral oils, kerosene, jet-fuel, white oils, diesel oils, olefins, organic esters, synthetic fluids, and mixtures thereof; 40 to 60 wt. % of water-soluble polymer selected from water-based polysaccharides, polyethylene oxide, acrylamide polymers, and mixtures thereof; and 1 to 3 wt. % of a styrenic diblock copolymer of formula A-B as a suspending agent, wherein the styrenic diblock copolymer is a hydrogenated styrene-(ethylene/propylene) (S-EP) block copolymer having a molecular weight of 175-225 kg/mole and a polystyrene (PSC) content of 30-50%; and
   inverting the slurry into water wherein the water-soluble polymer is released into water and hydrate;
   wherein the suspending agent maintains the water-soluble polymer in suspension in the slurry with less than 3 wt. % free hydrocarbon solvent separation in the slurry after at least 3 day standing before the slurry is inverted into water and wherein the slurry has a minimum mixing temperature of less than or equal to 95° F.

20. The method of claim 19, wherein the slurry has a viscosity at 70° F. of less than 1500 cp and a maximum suspension temperature of at least 120° F.

* * * * *